(12) United States Patent
Pier

(10) Patent No.: US 10,467,753 B1
(45) Date of Patent: Nov. 5, 2019

(54) METHODS AND APPARATUS FOR SLICING THREE DIMENSIONAL MEDICAL IMAGES ALONG CURVED ANATOMICAL SURFACES

(71) Applicant: OCEANIT LABORATORIES, INC., Honolulu, HI (US)

(72) Inventor: Edward Alan Pier, Honolulu, HI (US)

(73) Assignee: OCEANIT LABORATORIES, INC., Honolulu, HI (US)

( * ) Notice: Subject to any disclaimer, the term of this patent is extended or adjusted under 35 U.S.C. 154(b) by 48 days.

(21) Appl. No.: 15/092,005

(22) Filed: Apr. 6, 2016

Related U.S. Application Data

(60) Provisional application No. 62/144,302, filed on Apr. 7, 2015.

(51) Int. Cl.
*G06T 7/00* (2017.01)
*G06T 15/08* (2011.01)

(52) U.S. Cl.
CPC .......... *G06T 7/0014* (2013.01); *G06T 7/0044* (2013.01); *G06T 7/0085* (2013.01); *G06T 15/08* (2013.01); *G06T 2207/10101* (2013.01); *G06T 2207/20024* (2013.01); *G06T 2207/30004* (2013.01)

(58) Field of Classification Search
CPC .................. A61B 5/0066; G06T 2207/10101
See application file for complete search history.

(56) References Cited

U.S. PATENT DOCUMENTS

| | | | | |
|---|---|---|---|---|
| 5,915,048 A * | 6/1999 | Hill | ............... | G06K 9/58 382/255 |
| 6,064,423 A * | 5/2000 | Geng | ............... | G02B 27/2292 348/36 |
| 7,576,740 B2 * | 8/2009 | Dicken | ............... | G06T 15/40 345/424 |
| 7,840,047 B2 * | 11/2010 | Boing | ............... | G06T 15/08 378/4 |
| 2002/0110268 A1 * | 8/2002 | Brinker | ............... | G06T 5/006 382/131 |
| 2005/0002550 A1 * | 1/2005 | Jabri | ............... | G06T 11/005 382/131 |

(Continued)

OTHER PUBLICATIONS

Asloob Ahmad Mudassar and Saira Butt, "Extraction of Blood Vessels in Retinal Images Using Four Different Techniques", Dec. 17, 2013, Journal of Medical Engineering, 2013, p. 1-21.*

*Primary Examiner* — Gandhi Thirugnanam
(74) *Attorney, Agent, or Firm* — Symbus Law Group, LLC; Clifford D. Hyra

(57) ABSTRACT

Methods and apparatus for displaying information from a three dimensional imaging data cube, having particular application in ophthalmology, are disclosed. The method of the present invention slices 3D imaging data along curved surfaces that match anatomical layers, and comprising four steps: a locating step in which anatomical layers are located; a selecting step in which a slicing surface is selected based on the locations of the anatomical layers; an extracting step, wherein the user extracts data values that fall on the slicing surface selected; and a displaying step in which the data values extracted are displayed as a three dimensional image. The apparatus of the subject invention comprises hardware and software that employ the method of the subject invention to display improved anatomical 3D images.

13 Claims, 3 Drawing Sheets

(56) References Cited

U.S. PATENT DOCUMENTS

| | | | | |
|---|---|---|---|---|
| 2006/0269114 | A1* | 11/2006 | Metz | G06T 11/005 |
| | | | | 382/131 |
| 2006/0274926 | A1* | 12/2006 | Singh | A61B 6/14 |
| | | | | 382/131 |
| 2007/0282313 | A1* | 12/2007 | Huang | A61B 3/1005 |
| | | | | 606/5 |
| 2008/0025587 | A1* | 1/2008 | Asbeck | G06T 15/08 |
| | | | | 382/128 |
| 2009/0022384 | A1* | 1/2009 | Ritter | G01R 33/243 |
| | | | | 382/131 |
| 2009/0080752 | A1* | 3/2009 | Ruth | G06K 9/4638 |
| | | | | 382/132 |
| 2011/0102430 | A1* | 5/2011 | Eberhard | G06T 11/008 |
| | | | | 345/420 |
| 2012/0093278 | A1* | 4/2012 | Tsukagoshi | G06T 11/008 |
| | | | | 378/4 |
| 2012/0184845 | A1* | 7/2012 | Ishikawa | A61B 3/102 |
| | | | | 600/425 |
| 2013/0022255 | A1* | 1/2013 | Chen | G06K 9/34 |
| | | | | 382/131 |
| 2013/0308846 | A1* | 11/2013 | Chen | G06T 7/0012 |
| | | | | 382/131 |
| 2014/0218363 | A1* | 8/2014 | Dastmalchi | A61B 3/102 |
| | | | | 345/424 |
| 2015/0042949 | A1* | 2/2015 | Jeglorz | A61B 3/102 |
| | | | | 351/206 |
| 2015/0235369 | A1* | 8/2015 | Ishida | A61B 5/0033 |
| | | | | 382/131 |
| 2016/0225141 | A1* | 8/2016 | Hattersley | G06T 7/12 |
| 2017/0309080 | A1* | 10/2017 | Russakoff | G06T 19/00 |

* cited by examiner

METHODS AND APPARATUS FOR SLICING THREE DIMENSIONAL MEDICAL IMAGES ALONG CURVED ANATOMICAL SURFACES

CROSS-REFERENCE TO RELATED APPLICATION

This application claims the benefit of U.S. provisional patent application Ser. No. 62/144,302 filed on Apr. 7, 2015, in the name of the present inventor, which provisional application is incorporated in its entirety by this reference.

FIELD OF THE INVENTION

The present invention relates to the field of medical imaging. More particularly, the invention is concerned with improved methods and apparatus for displaying three dimensional images taken along curved anatomical surfaces.

BACKGROUND OF THE INVENTION

In recent years, three-dimensional ("3D") imaging techniques such as Magnetic Resonance Imaging (MRI), X-ray Computed Tomography (CT), ultrasound, and Optical Coherence Tomography (OCT) have become common tools for diagnosing and monitoring disease and injury. To visualize the dataset for a single three dimensional image (hereinafter referred to as a "dataset" or a "data cube") on a computer screen, software must present a two dimensional slice or projection of the full dataset. Typically the user explores the full imaged volume by translating a slice through the data cube. Current software only allows the user to slice the dataset along flat planar surfaces that do not conform to the curved anatomical surfaces within the body. The result is that a single slice probes a range of depths into the organs of interest.

For example, ophthalmological OCT imaging assembles a series of depth-wise "B-scans" of the back of the eye to form a data cube. The retina has a number of distinct anatomical layers, which are curved due to the spherical nature of the eyeball and the foveal pit. Therefore, a planar slice through an OCT dataset will probe multiple depths into the retina and not show a uniform image of any single layer.

An object of the subject invention is to provide for methods and apparatus that allow users to slice data cubes along non-planar anatomical surfaces.

A further object of the subject invention is to provide for methods and apparatus that display two dimensional slices of organs taken along non-planar anatomical surfaces.

A further object of the present invention is to provide for methods and apparatus that display images of organs along a single depth of said organ.

SUMMARY OF THE INVENTION

These and other objects are accomplished in the subject invention, methods for slicing 3D imaging data along curved surfaces that match anatomical layers, and apparatus employing such methods.

The subject invention automatically detects the anatomical layers and slices the data along curved surfaces that are offset from or interpolated between the layers. This anatomical surface slice technique has not previously been employed and represents a significant advance in 3D imaging data analysis. The method can be used with any type of 3D imaging, such as OCT, MRI, CT, ultrasound, and other methods. Accordingly, it has significant potential to enhance general 3D imaging.

The method of the subject invention comprises the steps of: (1) locating anatomical layers; (2) selecting a slicing surface; (3) extracting a series of data values that fall along the selected slicing surface; and (4) displaying an image using the extracted data values.

The apparatus of the subject invention comprises hardware including a scanning means, a central processing unit (CPU), and a display, and software that includes instructions to process information obtained from the scanner according to the method of subject invention. The processed information is then displayed as improved 3D images to a user.

The method and apparatus of the subject invention is of particular use when imaging non-planar, or curved, anatomic structures as, for example, structures of the eye.

One aspect of the subject invention is portraying medical images along anatomically defined, non-planar surfaces.

Another aspect of the subject invention is displaying slices of organs at a uniform depth of said organ.

A further aspect of the subject invention is displaying anatomical surfaces along a single depth of an organ.

Another aspect of the instant invention is an improved method of imaging structures of the eye.

Yet a further aspect of the subject invention is an apparatus that scans organs and displays medical images along anatomically defined, non-planar surfaces.

These and further aspects and other objects and features of the invention will be apparent from the disclosure, which includes the above and ongoing written specification, drawings and claims.

DETAILED DESCRIPTION OF PREFERRED EMBODIMENTS

The present invention comprises methods for slicing 3D imaging data along curved surfaces that match anatomical layers and an apparatus utilizing said methods.

Figure 1:
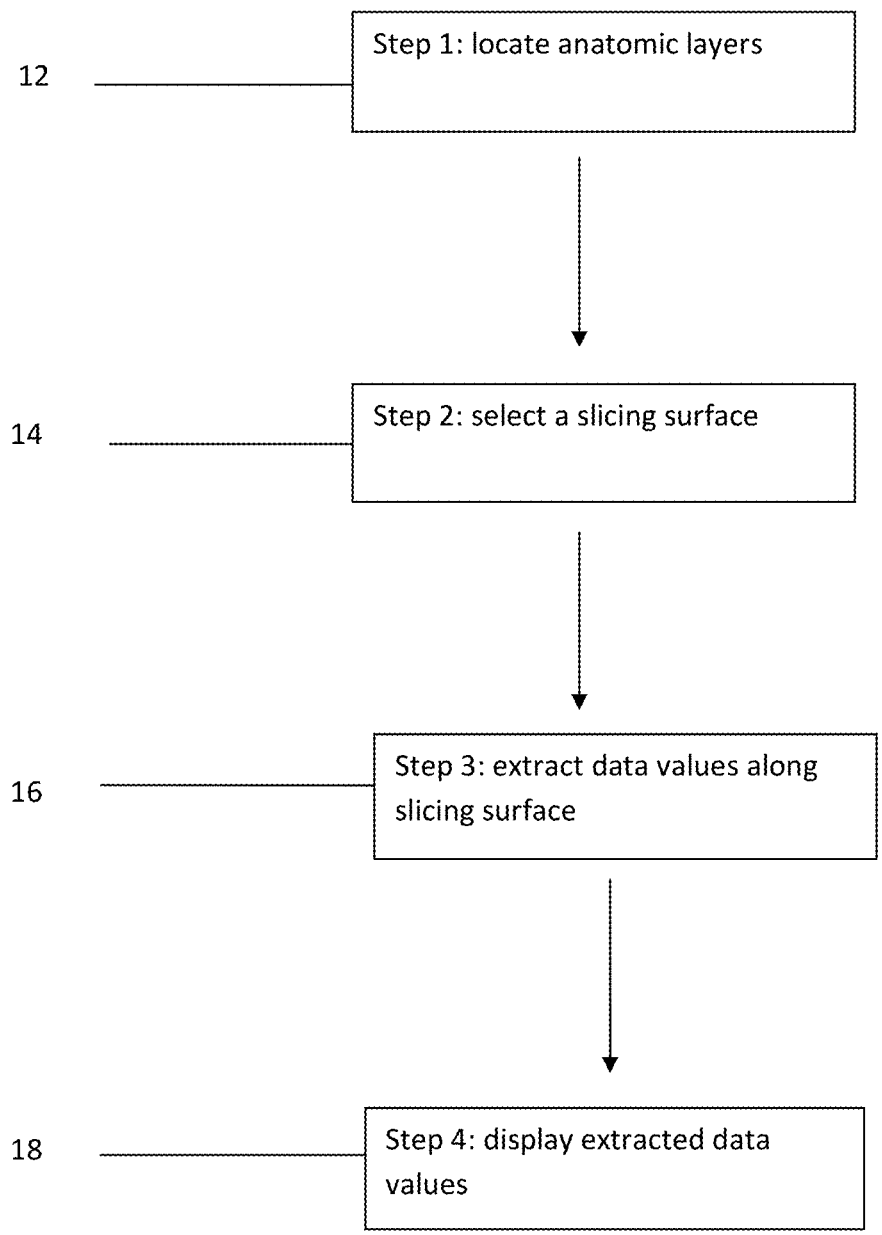
FIG. 1 is a flow diagram illustrating a method for slicing 3D images along curved anatomical surfaces in accordance with the present invention.

A preferred embodiment of the method of the present invention is illustrated in FIG. 1, in four steps: a locating step 12, a selecting step 14, an extracting step 16, and a displaying step 18.

In locating step 12, anatomical layers in the image are located. Edge detection algorithms known in the field can be utilized in locating step 12. In a preferred embodiment of the invention, the Canny edge detection algorithm is used to locate anatomical layers in each of the OCT B-scans and these are combined to define a surface. The Canny algorithm is a highly robust and effective known algorithm that combines the image derivatives with hysteresis thresholding.

In accordance with a further preferred embodiment, also in conjunction with locating step 12, the anatomical layer boundaries can be further emphasized by reducing the noise present in the image using a smoothing algorithm. Linear features present a particular challenge for smoothing because they are long in one direction and narrow in another. The most basic technique to smooth an image spatially is by convolving it with a Gaussian kernel. However, a Gaussian kernel sized to the narrow dimension will not produce much noise reduction, while a kernel sized to the long dimension will obliterate the feature altogether.

The solution is to use a linear kernel whose shape is similar to the feature of interest using a technique known as linear matched filtering. The difficulty with this technique is that linear features are often curved, so a linear filter with a particular orientation is not appropriate for the entire image. The instant invention overcomes that obstacle by using several filters with different orientations and selecting the minimum or maximum smoothed value for each pixel. A three dimensional edge detection algorithm can be used, or two dimensional edge detection can be applied to depth-wise slices and then assembled into a surface.

Figure 2:
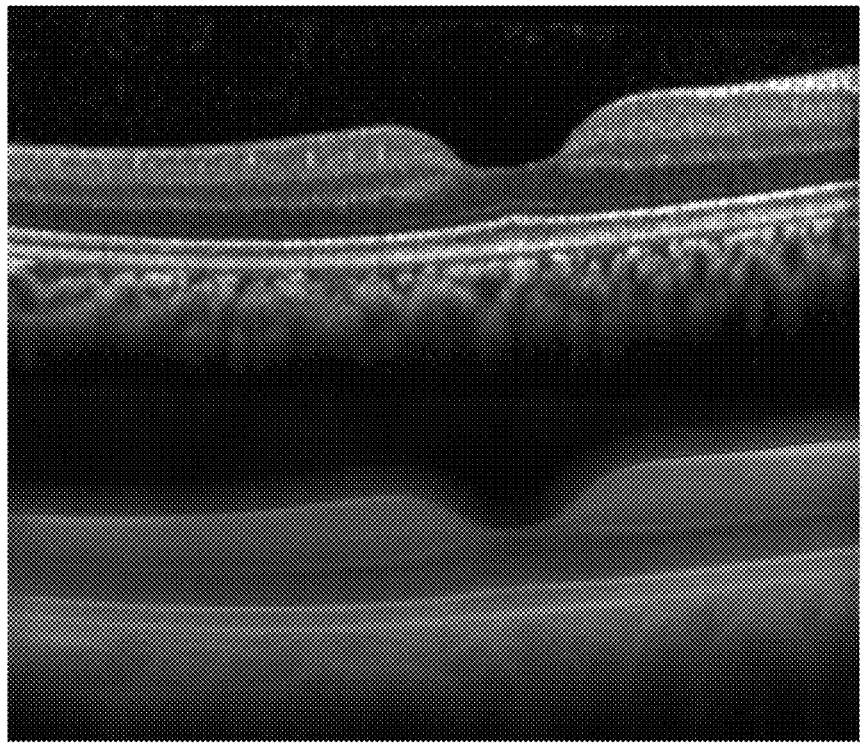
FIG. 2 is an illustration of a raw OCT B-scan and a version of the same after applying the linear matched filtering and Canny edge detection techniques in accordance with preferred embodiments of the locating step of the present invention.

Use of the Canny edge detection together with the linear matched filtering technique described above is illustrated in FIG. 2. Shown in FIG. 2, at top, is a raw OCT B-scan of the eye, and at bottom, the same scan after applying linear matched filtering and Canny edge detection algorithm to automatically locate anatomical layers in the eye.

In selecting step 14 of the subject invention, a particular slicing surface is selected based on the locations of the anatomical layers located in locating step 12. To view the entire data cube, the user must be able to translate the surface arbitrary distances away from the automatically detected anatomical layers. When multiple non-parallel layers are present, the technique can interpolate the surface between the detected layers to better match the anatomy throughout the volume. The interpolation can use any one of the standard techniques, such as, but not limited to, linear interpolation or cubic splines.

In extracting step 16, the user extracts from the data cube data values that fall on the slicing surface selected in selecting step 14. Because the slicing surface will in general pass between sample grid points, the data extraction can use a standard stepwise, linear, or other interpolation methods. The interpolated samples can be assembled into a two dimensional image that probes a single anatomical layer.

In displaying step 18 of the subject invention, the data values extracted in extracting step 16 are displayed as an image.

Figure 3:
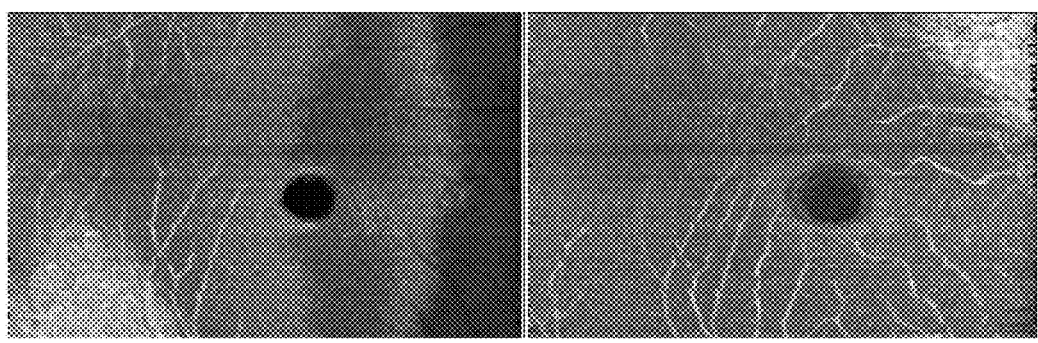
FIG. 3 is an illustration of a resulting image processed from an OCT data cube sliced along a flat plane and the resulting image that has been processed in accordance with the present invention.

FIG. 3 demonstrates the improved imaging of non-planar anatomic surfaces that can be obtained using the method of the subject invention. Presented in FIG. 3, at left, is an OCT data cube sliced along a flat plane and, at right, an image extracted using the anatomical surface slice technique of the subject invention. In the flat plane slice (left), the vasculature is only visible in part of the image and the plane does not probe a uniform tissue depth. In the anatomical surface sliced image (right), the uniform tissue depth follows the vessel depth and the vasculature is present throughout the image.

Figure 4:
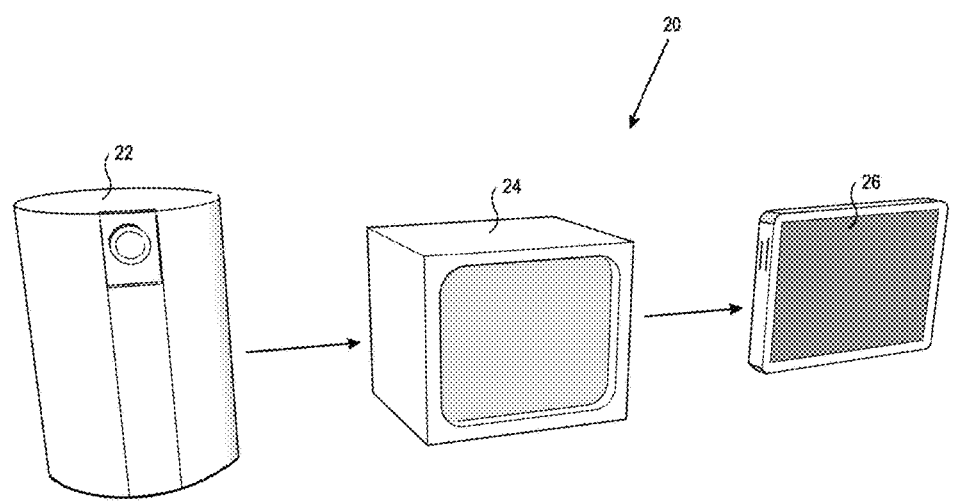
FIG. 4 is a schematic view of an apparatus for displaying three dimensional structures employing the methods of the present invention.

FIG. 4 is a schematic view of an apparatus 20 for displaying three dimensional images employing the methods of the present invention. Apparatus 20 comprises a scanning means 22, connected to a central processing unit 24, connected to a display 26. Scanning means 22 scans the anatomical structure to be imaged to obtain information that comprises a data cube. Scanning means 22 can be any variety of known and commercially available scanning technologies.

CPU 24 runs commercially available operating software and specialized application software. The specialized application software includes instructions to process the data cube information in accordance with the methods of the present invention, illustrated in FIG. 1 and described above. CPU 24 then sends the processed information to display 26 to produce improved 3D images of non-planar anatomical surfaces.

While the invention has been described with reference to specific embodiments, modifications and variations of the invention may be constructed without departing from the scope of the invention. For example, while the invention has been illustrated above with reference to imaging the human eye, it should be obvious to those skilled in the art that the invention may be employed with equal success for imaging other human organs, or tissues and organs of others organisms and structures.

SUMMARY AND SCOPE

As described above and illustrated in the accompanying figures, the method for displaying information from a three dimensional imaging data cube, and the apparatus for carrying out the method, represent significant advances in 3D imaging data analysis and produce improved 3D images to users. Said method can be used with any type of 3D imaging, such as OCT, MRI, CT, ultrasound, and other methods. Accordingly, the method and apparatus have significant potential to enhance general 3D imaging.

Unless otherwise indicated, all algorithms, dimensions, materials and so forth used in the specification and claims are to be understood as being examples and not limitations, and in any event, not as an attempt to limit the application of the doctrine of equivalents to the scope of the claims.

The terms "a," "an," "the," and similar references used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Certain embodiments are described herein, including the best mode known to the inventor for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein.

Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

I claim:

1. A method for displaying information from a three dimensional imaging data cube, comprising:
    (a) locating anatomical layers using an edge detecting algorithm based on information contained in said three dimensional imaging data cube, reducing noise in the image using a smoothing algorithm with a linear kernel by a linear matched filtering, using several filters with different orientations and selecting the minimum or maximum smoothed value for each pixel, and combining a plurality of scans to define a surface;
    (b) selecting a curved three dimensional slicing surface based on the locations of anatomical layers identified in step (a) and interpolating the defined surface between layers detected by the edge detecting algorithm to match anatomy throughout the volume;
    (c) extracting a series of data values from said three dimensional imaging data cube that fall along said selected slicing surface; and
    (d) displaying an image of said extracted data values.

2. The method of claim 1 wherein the edge detection algorithm is the Canny edge detection algorithm.

3. The method of claim 1 wherein a smoothing algorithm is used in the locating step to further emphasize the location of said anatomical layer.

4. The method of claim 1 wherein said slicing surface is interpolated between two identified anatomical layers to better match the anatomy throughout said three dimensional imaging data cube.

5. The method of claim 1 wherein said three dimensional imaging data is acquired through Optical Coherence Tomography.

6. An apparatus for displaying information from a three dimensional imaging data cube comprising a scanning means, a CPU, a display, and software that includes instructions to process information obtained from said scanning means performing the following operations:
    (a) locating anatomical layers using an edge detecting algorithm based on information contained in said three dimensional imaging data cube, reducing noise in the image using a smoothing algorithm with a linear kernel by a linear matched filtering, using several filters with different orientations and selecting the minimum or maximum smoothed value for each pixel, and combining a plurality of scans to define a surface;
    (b) selecting a curved three dimensional slicing surface based on the locations of anatomical layers identified in step (a) and interpolating the defined surface between layers detected by the edge detecting algorithm to match anatomy throughout the volume;
    (c) extracting a series of data values from said three dimensional imaging data cube that fall along said selected slicing surface; and
    (d) displaying an image of said extracted data values.

7. The method of claim 6 wherein the edge detection algorithm is the Canny edge detection algorithm.

8. The method of claim 6 wherein a smoothing algorithm is used in the locating step to further emphasize the location of said anatomical layer.

9. The method of claim 6 wherein said slicing surface is interpolated between two identified anatomical layers to better match the anatomy throughout said three dimensional imaging datacube.

10. The method of claim 6 wherein the scanning means is Optical Coherence Tomography.

11. A method for displaying information from a three dimensional imaging data cube, comprising:
    (a) locating anatomical layers based on information contained in said three dimensional imaging data cube;
    (b) selecting a curved three dimensional slicing surface based on the locations of anatomical layers identified in step (a);
    (c) extracting a series of data values from said three dimensional imaging data cube that fall along said selected slicing surface; and
    (d) displaying an image of said extracted data values;
    wherein said locating step further comprises reducing noise present in said three dimensional imaging data cube using linear matched filtering with a plurality of filters, each having a different spatial orientation.

12. The method of claim 11, wherein said using step further comprises:
    choosing a minimum or a maximum smoothed value for each pixel in said three dimensional imaging data cube.

13. The method of claim 11, wherein said selecting step further comprises:
    interpolating the curved three dimensional slicing surface between the anatomical layers.

* * * * *